(12) United States Patent
Chiba

(10) Patent No.: US 9,728,753 B2
(45) Date of Patent: Aug. 8, 2017

(54) CELL MODULE

(71) Applicant: MITSUBISHI HEAVY INDUSTRIES, LTD., Tokyo (JP)

(72) Inventor: Daisuke Chiba, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 102 days.

(21) Appl. No.: 14/438,468

(22) PCT Filed: Nov. 12, 2013

(86) PCT No.: PCT/JP2013/080546
§ 371 (c)(1),
(2) Date: Apr. 24, 2015

(87) PCT Pub. No.: WO2014/080797
PCT Pub. Date: May 30, 2014

(65) Prior Publication Data
US 2015/0287963 A1    Oct. 8, 2015

(30) Foreign Application Priority Data

Nov. 21, 2012  (JP) ................................. 2012-255698

(51) Int. Cl.
*H01M 2/10* (2006.01)
*H01M 10/6563* (2014.01)
(Continued)

(52) U.S. Cl.
CPC .............. *H01M 2/1016* (2013.01); *B60K 1/04* (2013.01); *B60L 11/1874* (2013.01);
(Continued)

(58) Field of Classification Search
CPC ........... H01M 2/1016; H01M 10/6563; H01M 10/647; H01M 10/6557; H01M 2/1072;
(Continued)

(56) References Cited

U.S. PATENT DOCUMENTS

2006/0093901 A1    5/2006  Lee et al.
2009/0173558 A1    7/2009  Watanabe et al.
(Continued)

FOREIGN PATENT DOCUMENTS

CN          1812182 A       8/2006
JP       2009-238645 A     10/2009
(Continued)

OTHER PUBLICATIONS

Written Opinion dated Jan. 7, 2014, issued in corresponding application No. PCT/JP2013/080546 (w/English translation) (10 pages).
(Continued)

*Primary Examiner* — Muhammad Siddiquee
(74) *Attorney, Agent, or Firm* — Westerman, Hattori, Daniels & Adrian, LLP

(57) ABSTRACT

A cell module includes a battery pack in which a plurality of electrical cells are arranged; and a bottom plate member that supports the battery pack. The bottom plate member includes an ejector for ejecting a liquid on the bottom plate member in a direction intersecting in an arrangement direction of the electrical cells and in an extending direction of the bottom plate member.

6 Claims, 8 Drawing Sheets

(51) Int. Cl.
*H01M 10/647* (2014.01)
*H01M 10/6557* (2014.01)
*H01M 10/613* (2014.01)
*B60K 1/04* (2006.01)
*B60L 11/18* (2006.01)

(52) U.S. Cl.
CPC ....... *H01M 2/1022* (2013.01); *H01M 2/1072* (2013.01); *H01M 10/613* (2015.04); *H01M 10/647* (2015.04); *H01M 10/6557* (2015.04); *H01M 10/6563* (2015.04)

(58) Field of Classification Search
CPC .............. H01M 2/1022; H01M 10/613; B60L 11/1874; B60K 1/04
See application file for complete search history.

(56) References Cited

U.S. PATENT DOCUMENTS

2009/0246606 A1* 10/2009 Shimizu .............. H01M 10/625
  429/62
2010/0116570 A1 5/2010 Sugawara et al.
2012/0251848 A1 10/2012 Cho

FOREIGN PATENT DOCUMENTS

| JP | 2011-096398 A | 5/2011 |
| JP | 2012-094376 A | 5/2012 |
| JP | 2013-199185 A | 10/2013 |
| WO | 2007/102357 A1 | 9/2007 |

OTHER PUBLICATIONS

European Search Report dated Nov. 4, 2015, issued in counterpart European patent application No. 13856177.4 (6 pages).
Office Action dated Jul. 4, 2016, issued in counterpart Chinese Patent Application No. 201380055894.8, with Partial of the Search Report. (11 pages).
International Search Report dated Jan. 7, 2014, issued in corresponding application No. PCT/JP2013/080546.

* cited by examiner

CELL MODULE

TECHNICAL FIELD

The present invention relates to a cell module including a battery pack in which a plurality of cells are arranged.

Priority is claimed on Japanese Patent Application No. 2012-255698, filed Nov. 21, 2012, the content of which is incorporated herein by reference.

BACKGROUND ART

In cell modules including a battery pack in which a plurality of cells are arranged, a cell module including a bottom plate member that supports a battery pack from below is known. In this type of cell module, there is known a technique of making through-holes through which cooling wind passes in a vertical direction in the bottom plate member in order to efficiently cool the battery pack (for example, refer to Patent Document 1).

PRIOR ART DOCUMENT

Patent Document

[Patent Document 1] Japanese Unexamined Patent Application, First Publication No. 2011-096398

SUMMARY OF INVENTION

Technical Problem

However, since the through-holes are formed on the above cell module in the vertical direction, water may enter the cell module from below. Additionally, when the battery pack is cooled, dew condensation may occur. Water may drop due to this dew condensation, and the water may stagnate on the bottom plate member. Therefore, adjacent electrical cells may be electrically connected together via the water, and trouble, such as corrosion resulting from this electrical connection, may occur.

Technical Solution

According to a first aspect of the invention, a cell module includes a battery pack in which a plurality of electrical cells are arranged; and a bottom plate member that supports the battery pack. The bottom plate member includes an ejector for ejecting a liquid on the bottom plate member in a direction intersecting in an arrangement direction of the electrical cells and in an extending direction of the bottom plate member.

According to a second aspect of the invention, in the cell module of the first aspect the ejector may include a first inclination suffice that inclines toward the direction in which the liquid is ejected.

According to a third aspect of the invention, in the cell module of the first or second aspect, the bottom plate member may include a groove portion that is recessed in a direction separating from a bottom surface of the electrical cell and extends in the direction in which the liquid is ejected, and a supporting portion that contacts with the bottom surface of the electrical cell and the groove portion may be provided between the supporting portions adjacent to each other in the arrangement direction of the electrical cells.

According to a fourth aspect of the inventory in the cell module of the third aspect, the groove portion may include a first inclination surface, which inclines toward the direction in which the liquid is ejected, on the bottom portion of the groove portion.

According to a fifth aspect of the invention, in the cell module of the third or fourth aspect, the bottom plate member may include a second inclination surface that inclines so as to separate from the bottom surface of the electrical cell, from the supporting portion toward the groove portion.

According to a sixth aspect of the invention, in the cell module of any one aspect of the third to fifth aspects, the supporting portion may linearly contact with the bottom surface of the electrical cell in the direction intersecting the arrangement direction of the electrical cells and in the extending direction of the bottom plate member.

According to a seventh aspect of the invention, in the cell module of any one aspect of the third to sixth aspects, an insulating plate that performs electrical insulation between cases of the electrical cells adjacent to each other may be provided between the cases of the electrical cells, and the entire edge portion of the insulating plate on the bottom plate member side may contact with the bottom plate member.

According to an eighth aspect of the invention in the cell module of the seventh aspect the ejector may be provided between the insulating plates.

Advantageous Effects of Invention

According to the above-described cell module, it is possible to suppress the electrical connection between the cases of the electrical cells adjacent to each other to prevent trouble such as corrosion, from occurring.

DESCRIPTION OF EMBODIMENTS

Figure 1:
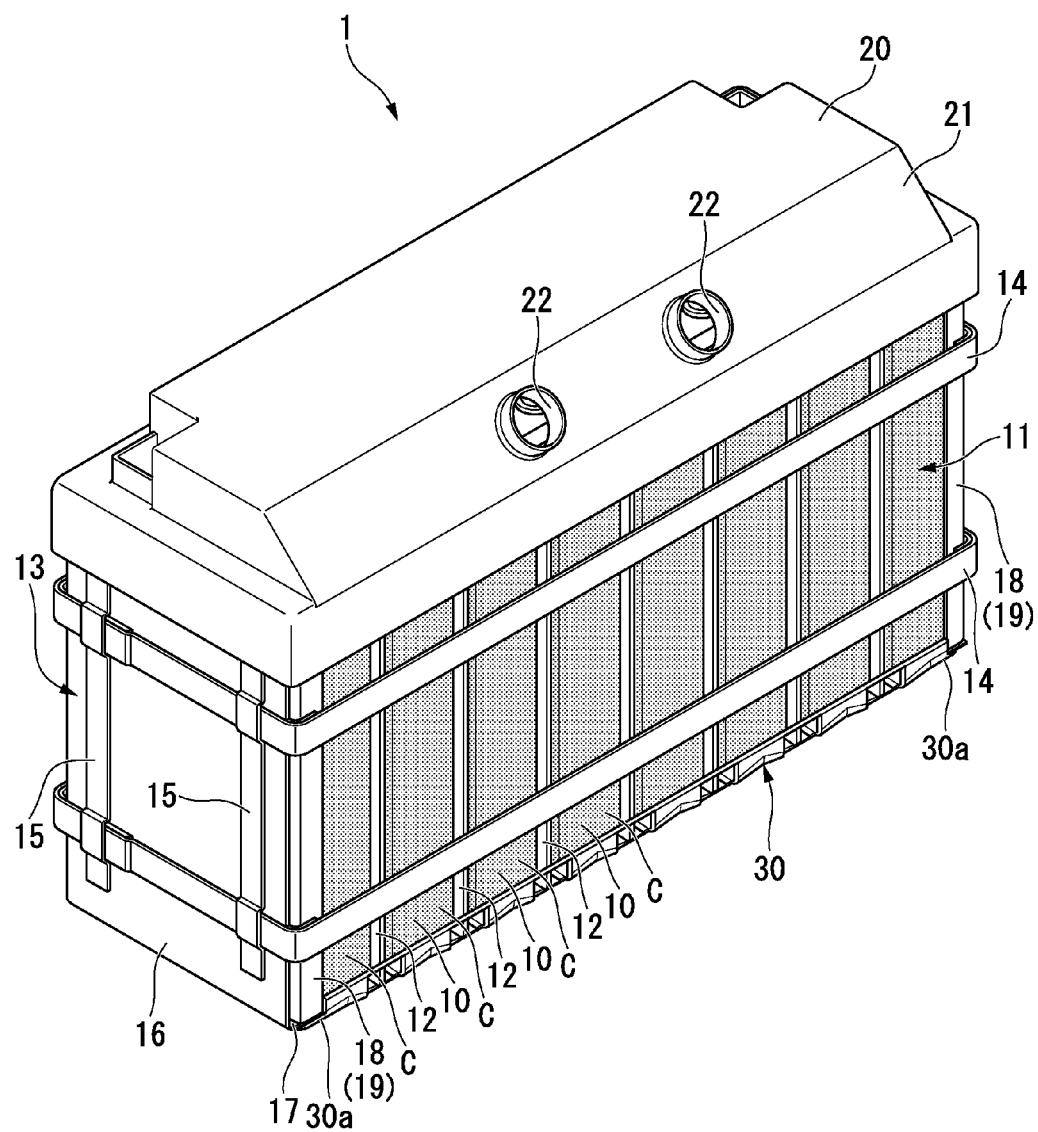
FIG. 1 is a perspective view of a cell module in a first embodiment of the invention.

Next, a cell module 1 in a first embodiment of the invention will be described with reference to the drawing.

FIG. 1 illustrates the cell module 1 of this embodiment. As illustrated in FIG. 1, the cell module 1 includes a battery pack 11. The battery pack 11 is formed by arranging a plurality of electrical cells 10 in a row in the thickness direction thereof. Each electrical cell 10 is formed in a substantially rectangular parallelepiped shape that has electrodes (not illustrated) formed at an upper portion thereof. The electrodes of the respective electrical cells 10 are connected in series or in parallel by tie-bars (not illustrated) or the like. The battery pack 11 includes a flat plate-shaped insulating member (insulating plate) 12 between the electrical cells 10 adjacent to each other. Primarily, the insulating member electrically insulates facing wall surfaces of cases C of the respective electrical cells 10.

The cell module 1 includes a casing 13 that houses the battery pack 11. The casing 13 includes two side frames 14 and two support frames 15.

Each side frame 14 is formed like a belt. The two side frames surround an upper portion and a lower portion of the battery pack 11. Each support frame 15 is formed like a belt that that extends in a vertical direction.

The support frame 15 combines the two side frames 14 at both ends in an arrangement direction of the electrical cells 10 (hereinafter simply referred to as an arrangement direction).

The casing 13 has side plates 16 that cover end surfaces of the battery pack 11, at both of the ends in the arrangement direction. Each side plate 16 has a flange portion 17, which is bent inward in the arrangement direction, at a lower edge thereof. Bach flange portion 17 is arranged so as to go around to a bottom surface 34 side of the battery pack 11. The side frames 14 are fixed to the side plate 16. Inner plates 19 are disposed inside the side plates 16 in the arrangement direction. Each inner plate 19 includes a bent portion 18. The bent portion 18 is formed by bending an outer edge of the inner plate 19 in its width direction so as to go around to a side surface side of the battery pack 11 in its width direction. In addition, a direction that intersects the arrangement direction of the electrical cells 10, and an extending direction of the support plate 30 to be described below are each simply referred to as a width direction.

The casing 13 further has an upper cover 20 that covers the upper portion of the battery pack 11. The upper cover 20 is provided to prevent water, dust, or the like from adhering to the respective electrodes of the electrical cells 10 and the tie-bars. An upper inclination surface 21 formed at the upper cover 20 is formed with an access hole 22 for inserting wiring lines that perform electrical connection. The casing 13 includes a support plate (bottom plate member) 30 that supports the battery pack 11 from below. The support plate 30 has support plate portions 30a on both sides in the arrangement direction. Each support plate portion 30a is supported by the flange portion 17 of the side plate 16.

Figure 2:
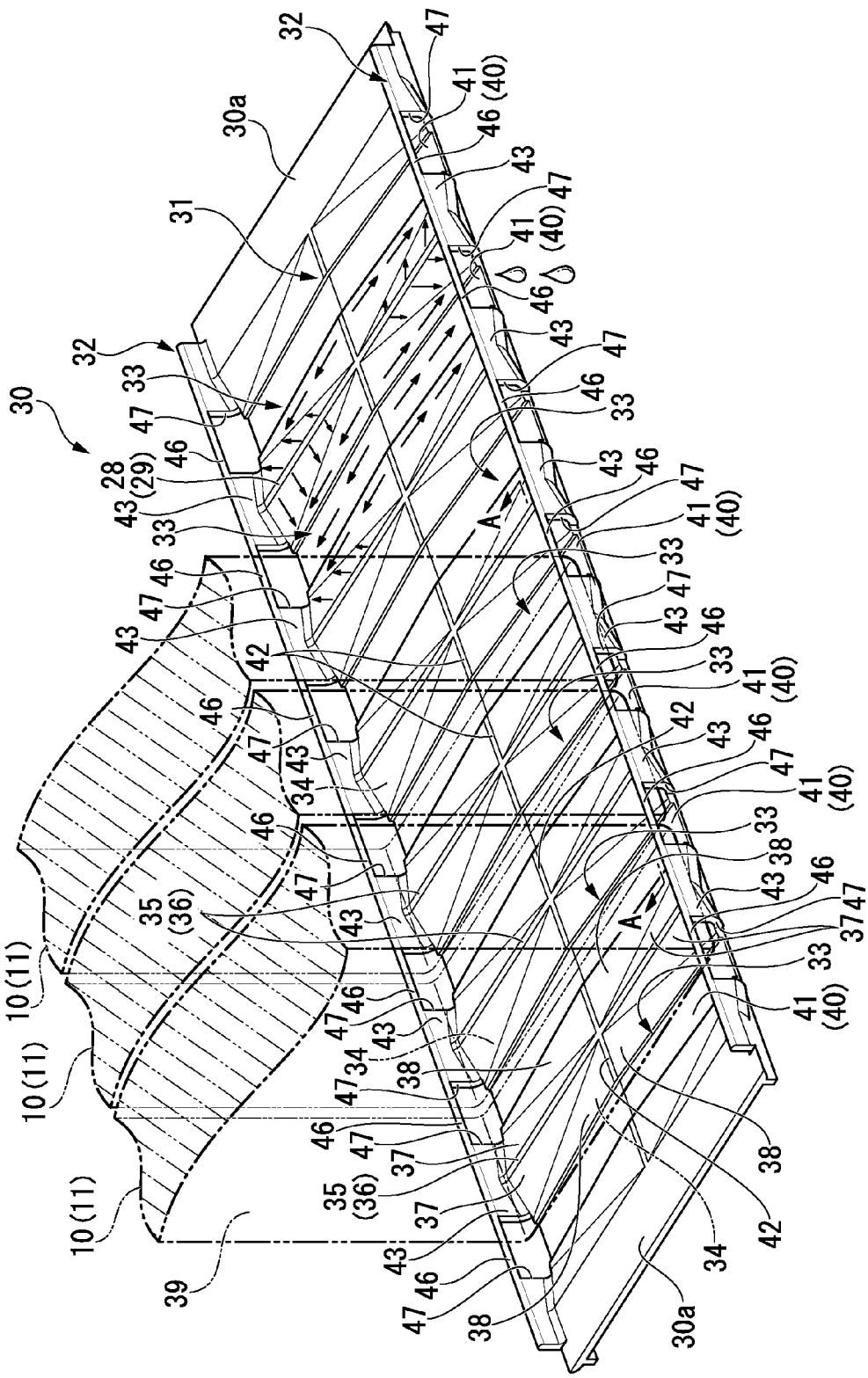
FIG. 2 is a perspective view illustrating a support plate of the cell module in the first embodiment of the invention.

As illustrated in FIG. 2, the support plate 30 includes a main plate portion 31 and side wall portions 32.

The main plate portion 31 supports the bottom surface 34 of the battery pack 11 from below.

Primarily, the side wall portions 32 regulate displacement the battery pack 11 in the width direction. The side wall portions 32 are formed so as to rise upward from both sides in a width direction of the main plate portion 31 orthogonal to the arrangement direction.

Figure 3:
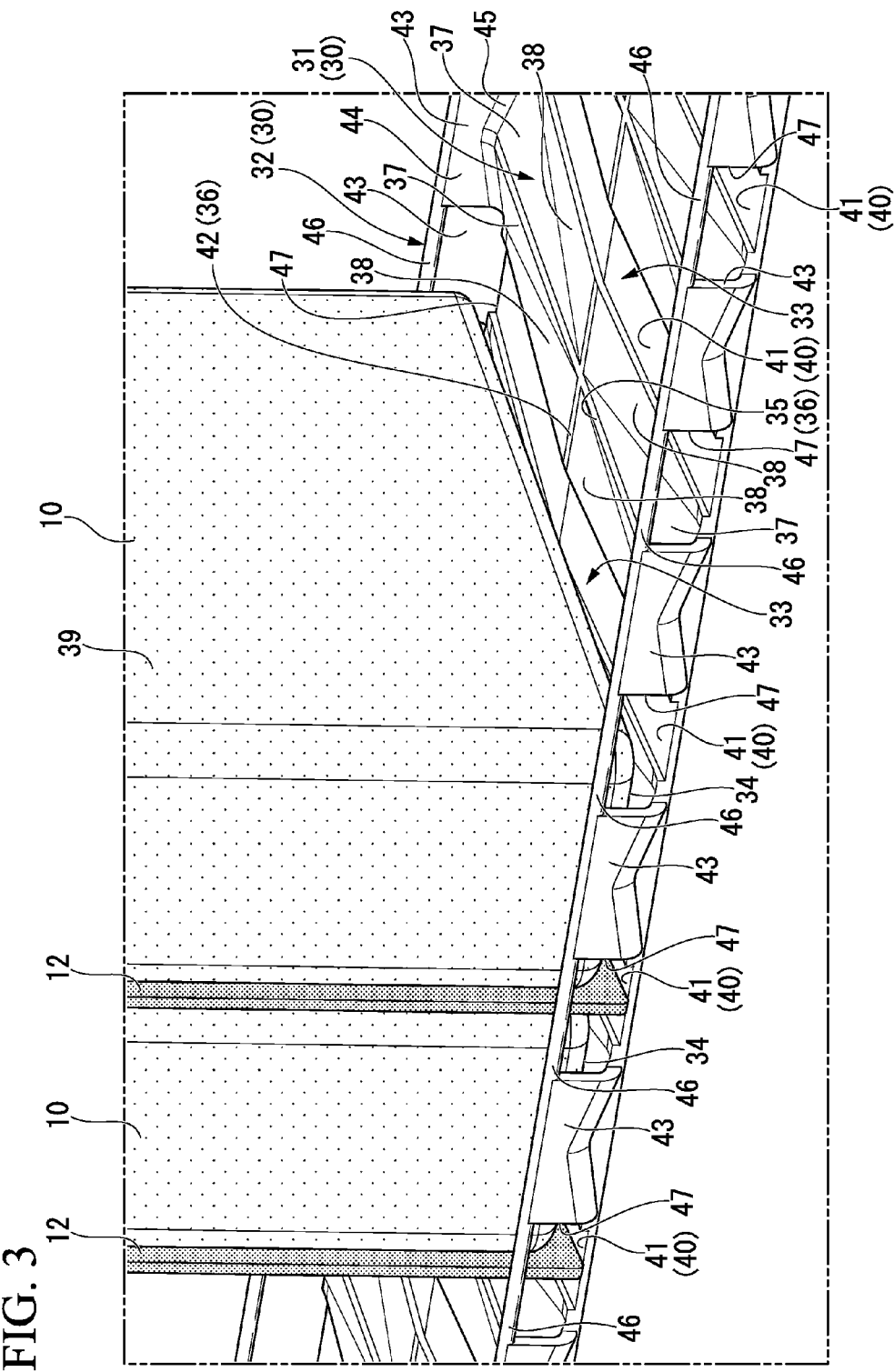
FIG. 3 is an enlarged perspective of lower portions of electrical cells supported by the support plate in the first embodiment.

As illustrated in FIGS. 2 and 3, the main plate portion 31 is provided with a plurality of ejection portions (ejector) 33 that eject a liquid, such as water that is present on the support plate 30, due to the self-weight of the liquid. The ejection portions 33 are formed side by side in the arrangement direction. Bach ejection portion 33 includes a supporting portion 36, an array-side inclination surface 37, and a width-side inclination surface 38 (first inclination surface).

The supporting portion 36 includes a first supporting portion 35 that linearly contacts with the bottom surface 34 of the electrical cell 10 at the center in the arrangement direction.

The array-side inclination surface 37 is formed so as to come down toward both sides in the arrangement direction from the first supporting portion 35.

The fire width-side inclination surface 38 is connected to a lower edge of the array-side inclination surface 37 and is inclinedly formed to incline so as to come down toward the outsides in the width direction.

Figure 5:
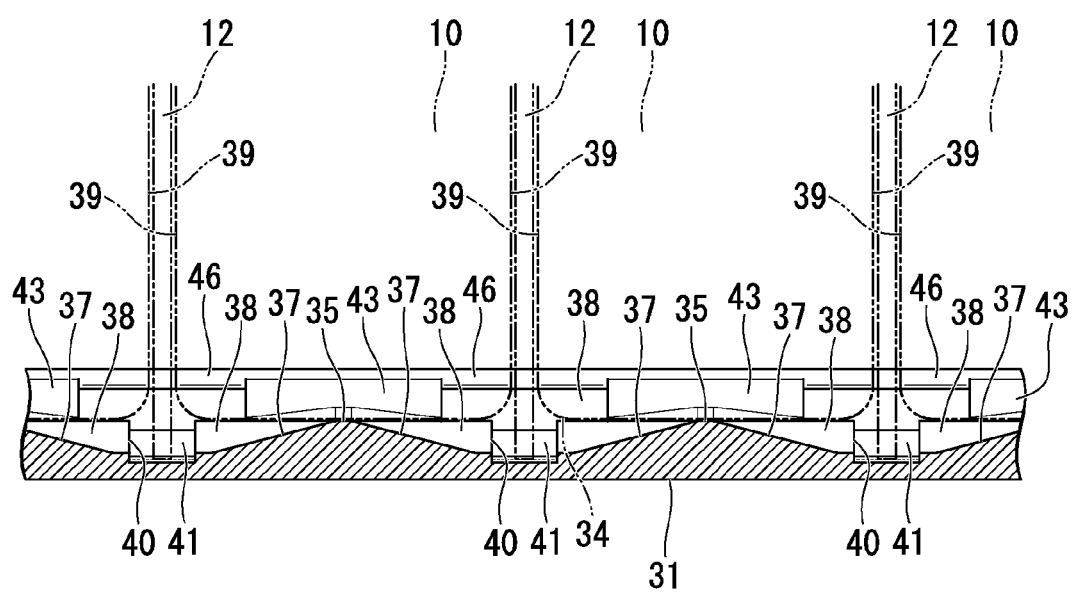
FIG. 5 is a cross-sectional view taken along line A-A of FIG. 2.

Groove portions 40, which extend toward the width directions are further termed at positions below facing surfaces 39 (refer to FIG. 5) of the respective adjacent electrical cells 10, between the first supporting portions 35 adjacent to each other in the arrangement direction. Each groove portion 40 is formed so as to be recessed in a direction separating from the bottom surface 34 of the electrical cell 10. A groove bottom surface 41 (first inclination surface) of the groove portion 40 is inclinedly formed so as to come down toward the outsides in the width direction. The width of the groove portion 40 is formed wife a substantially constant width that is more sufficient than a gap between the cases C that form the outlines of the respective electrical cells 10. The above-described array-side inclination surface (second inclination surface) 37 inclines so as to separate from the bottom surface 34 of the electrical cell 10 from the first supporting portion 35 toward the groove portion 41. Here, the first inclination surface is a surface that inclines toward a direction in which water is ejected, and is the width-side inclination surface 37 and the groove bottom surface 41. Hereinafter, a case where both of the width-side inclination surface 37 and the groove bottom surface 41 incline will be described as an example. However, the invention is not limited to this, for example, the width-side inclination surface 37 may incline toward the groove portion 40, or the groove bottom, surface 41 incline may not incline but may be made horizontal. The array-side inclination surface 38 is not limited to a case where the array-side inclination surface is formed so as to come down from the first supporting portion 35 toward both sides in the arrangement direction. For example, the array-side inclination surface 38 may be omitted together with the width-side inclination surface 37.

The supporting portion 36 includes a second supporting portion 42 that linearly contacts with the bottom surface 34 of the electrical cell 10 at the center in the width direction. The second supporting portion 42 is intermittently formed in the arrangement direction excluding places where the groove portions 40 are formed. The width-side inclination surface 38 inclines so as to come down from the second supporting portion 42 toward both sides in the width direction. A central portion of the groove bottom surface 41 in the width direction is the highest. The groove bottom surface 41 inclines so as to come down toward both sides in the width direction. The central portion of the groove bottom surface 41 in the width direction is arranged below a central portion of the width-side inclination surface 38 in the width direction, in the vertical direction. Here, the width-side inclination surface 38 and the array-side inclination surface 37 may not be limited to being planar surfaces, but may be slightly concavely or convexly curved surfaces.

The array-side inclination surface 37 is formed such that the width dimension thereof in the arrangement direction becomes smaller toward the center in the width direction. The width-side inclination surface 38 is formed such that the width dimension thereof in the arrangement direction becomes smaller toward the outsides in the width direction. A ridgeline formed by the two array-side inclination surfaces 37 adjacent to each other in the arrangement direction constitutes the first supporting portion 35. A ridgeline formed by the two width-side inclination surface 38 adjacent to each other in the width direction constitutes the second supporting portion 42.

The side wall portion 32 has a plurality of vertical walls 43 that rise from outer edge portions of the array-side inclination surface 37 and the first supporting portion 35 in the width direction. Inner surfaces 44 (refer to FIG. 3) of the vertical walls 43 in the width direction are connected with the array-side inclination surface 37 and the first supporting portion 35 via a concave curve 45. An upper connecting portion 46 is formed at the side wall portion 32 so as to bridge over upper portions of the vertical walls 43 adjacent to each other. A through-hole 47, which passes through the inside and the outside of the side wall portion 32 toward the outsides in the width direction, is formed by a lower side of the upper connecting portion 46, two facing side portions that are the vertical walls 43, and a lateral side portion of the main plate portion 31. Here, although an example in which the inner surface 44, the array-side inclination surface 37, and the first supporting portion 35 are connected together by the concave curve 45 has been described, the invention is not limited to this.

Figure 4:
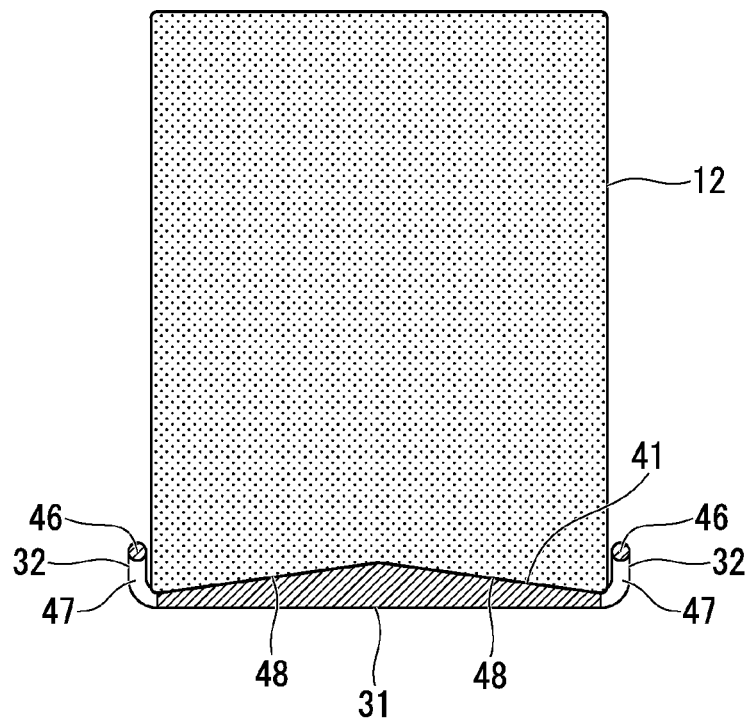
FIG. 4 is a partial cross-sectional view illustrating a contact state between an insulating member and the support plate that are arranged between the electrical cells in the first embodiment.

As illustrated in FIG. 3, the insulating member 12 arranged between the respective electrical cells 10 is arranged substantially at the center of the width-side inclination surface 38 in the arrangement direction. In other words, the insulating member 12 is arranged substantially at the center of the groove portion 40 in the arrangement direction. As illustrated in FIG. 4, the insulating member 12 includes a shape corresponding to the Inclination of the groove bottom surface 41 so as to come into close contact with the groove bottom surface 41. The entire edge portion of the insulating member 12 on the groove bottom surface 41 side contacts with the groove bottom surface 41. That is, the lower edge of the insulating member 12 includes an inclined bottom surface 48 that inclines from a central portion thereof in the width direction toward both sides in the width direction.

The cell module in this embodiment includes the above configuration. Next, the operation of this cell module will be described referring to the drawings. Here, in the description of this operation, a case where dew condensation is caused by cooling the battery pack 11 with cooling wind or the like, and the wafer caused by this dew condensation is dropped and ejected onto the support plate 30 will be described as an example.

Firsts the water adhering to the surface of the electrical cell 10 moves to the bottom surface 34 side along a side surface due to the self-weight thereof. Then, the water drops onto the support plate 30 or flows down along the supporting portion 36, mainly from and between a lower corner of the electrical cell 10 and a place that contact with the supporting portion 36 of the bottom surface 34.

In this case, the water, which has dropped onto the first supporting portion 35 or has flowed down via the array-side inclination surface 37, as indicated by an arrow in FIG. 2, flows toward the downside in the arrangement direction, along the array-side inclination surface 37 due to the self-weight thereof, and moves onto the width-side inclination surface 38.

On the other hand, the water, which has dropped onto the width-side inclination surface 38 or has flowed down via the second supporting portion 42, flows toward the outsides and the downside in the width direction along the width-side inclination surface 38 due to the self-weight thereof and then, most of the water flows into the groove portion 40 because the width-side inclination surface 38 becomes narrower toward the outside in the width direction.

The water which has directly dropped into the groove portion 40, the water that has fallen along the insulating member 12, and the water that has flowed in from the width-side inclination surface 38, flows toward the outside and the downside in the width direction along the inclination of the groove bottom surface 41 of the groove portion 40 due to the self-weight thereof, and is ejected from the through-hole 47 of the side wall portion 32 to the outside in the width direction of the support plate 30. The water within the groove portion 40 is regulated in its movement in the arrangement direction, by the insulating member 12. Therefore, the water generated from the two electrical cells 10 adjacent to each other is not mixed together.

Therefore, according to the cell, module of the above-described first embodiment, it is possible to prevent that the water stagnate on the support plate 30 because a situation in which the water resulting from dew condensation or the like is ejected to the outsides in the width direction, by the support plate 30 so as to bridge between the adjacent electrical cells 10. Therefore, it is possible to suppress the electrical connection between the cases of the electrical cells 10 adjacent to each other to prevent trouble, such as corrosion, from occurring.

Additionally, water can be moved, due to the self-weight thereof along the inclination of the array-side inclination surface 37 or the width-side inclination surface 38. Therefore, the water on the support plate 30 can be ejected using a simple configuration.

Moreover, as the groove portion 40 is arranged between the supporting portions 36, the bottom surface 34 of each electrical cell 10 can be supported by the supporting portion 36. When the water adhering to each electrical cell 10 flows downward, the water can be made to flow into the groove portion 40. Therefore, even if minute shaking or the like has occurred, the water, which has flowed, into the groove portion 40, can be prevented from adhering to the electrical cell 10.

Additionally, as the groove bottom surface 41 of the groove portion 40 inclines, the water, which has flowed into the groove portion 40, can be smoothly ejected from, the support plate 30. Moreover, since the through-hole in the vertical direction is not formed in the support plate 30, it is possible to prevent entering of water from below.

Additionally, since the width-side inclination surface 38 and the groove bottom surface 41 incline from the center in the width direction toward the outside, it is possible to eject the water, which has dropped or flowed in onto the width-side inclination surface 38 and the groove bottom surface 41, to the outsides of the support plate 30 in the width direction at the shortest distance. Therefore, water can be rapidly ejected. A case where the width-side inclination surface 38 inclines from the central portion toward the outside in the width direction has been described in the above-described first embodiment. However, the width-side inclination surface 38 may be formed so as to incline from a first end toward a second end in the width direction.

Next, a cell module of a second embodiment of the invention will be described with reference to the drawings. The second, embodiment is different from the above-described first embodiment in that when the self-weight of water is not used positively when the water is ejected from on the support plate. Therefore, the same portions will be described with the same symbols attached thereto.

Figure 6:
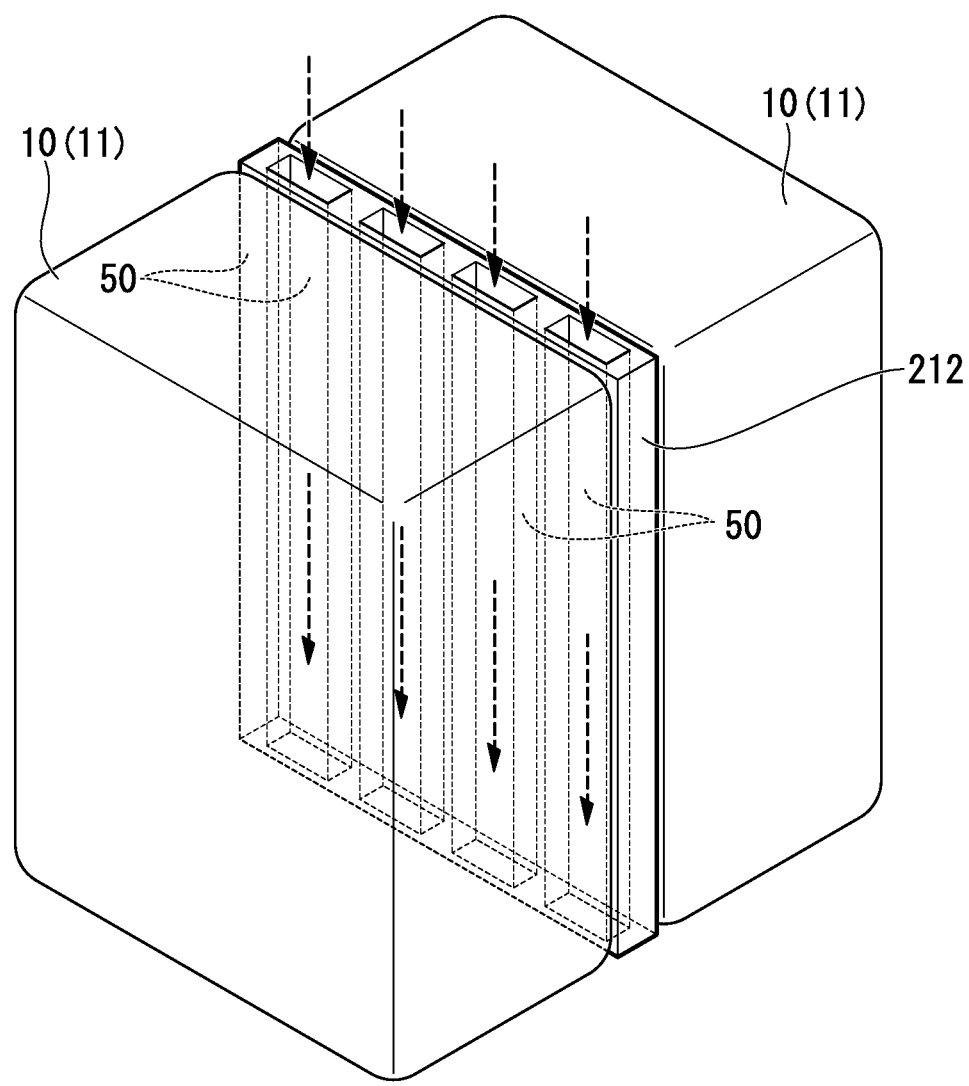
FIG. 6 is a perspective view illustrating an insulating member between electrical cells in a second embodiment of the invention.

As illustrated in FIG. 6, the cell module of the second embodiment includes an insulating member 212 between the cases of the electrical cells 10. The insulating member 212 includes air passageways 50 for allowing air to flow in the vertical direction between the cases of the respective electrical cells 10. Air is supplied to these air passageways 50 from an air supplier, such as a blower (not illustrated) and air flows downward from above (indicated by an arrow in FIG. 6).

Figure 7:
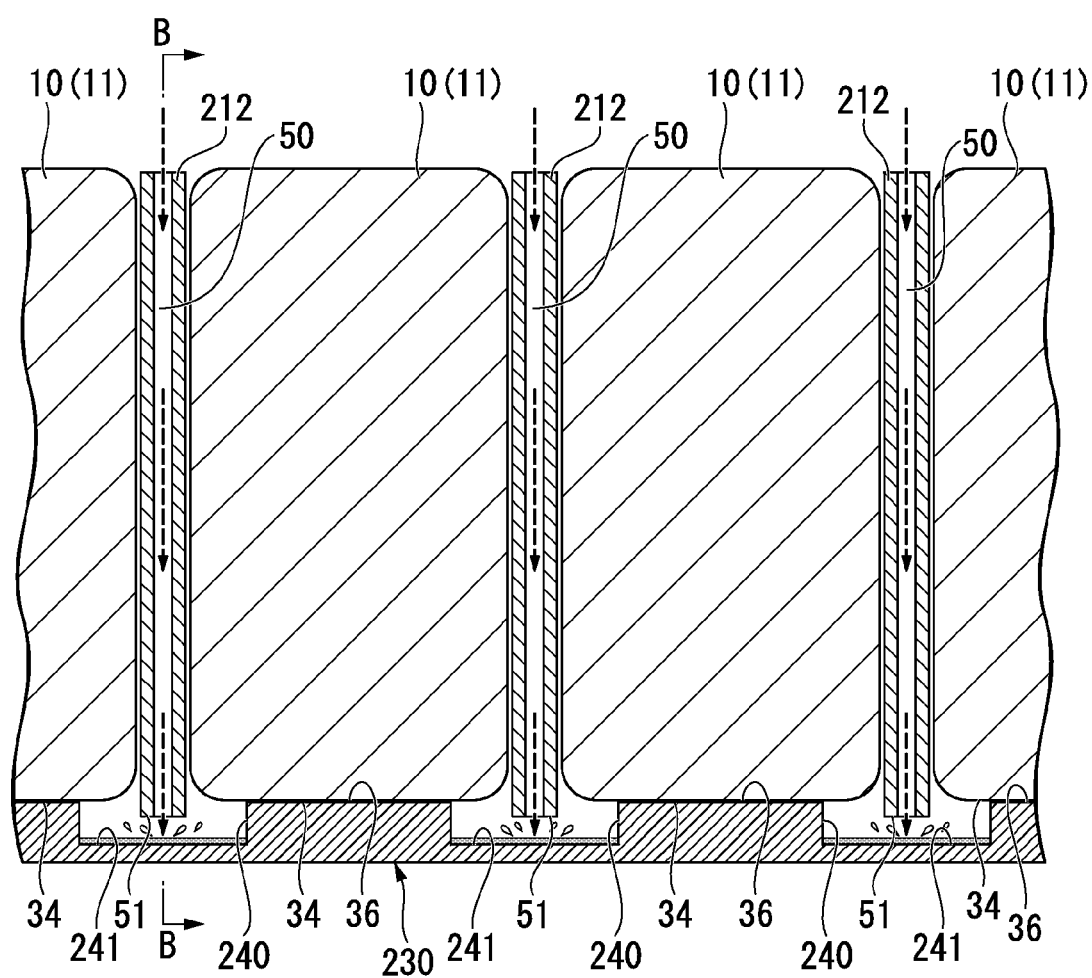
FIG. 7 is a cross-sectional view corresponding to FIG. 5 in the second embodiment.

As illustrated in FIG. 7, a support plate (bottom plate-member) 230 that supports the battery pack 11 from below includes the supporting portions 36 and groove portions 240.

Each supporting portion 36 supports a substantially central portion of the bottom surface 34 of the electrical cell 10 in the arrangement direction from below.

Each groove portion 240 is formed between the supporting portions 36, and is formed so as to be recessed in a direction separating front the bottom surface 34. Here, although illustration is omitted, the support plate 230 of the second embodiment also has the side wall portions 32 (refer to FIG. 2), similar to the above-described first embodiment. In each side wall portion 32, a penetration portion 47 is formed at a position where the groove portion 240 is formed.

Figure 8:
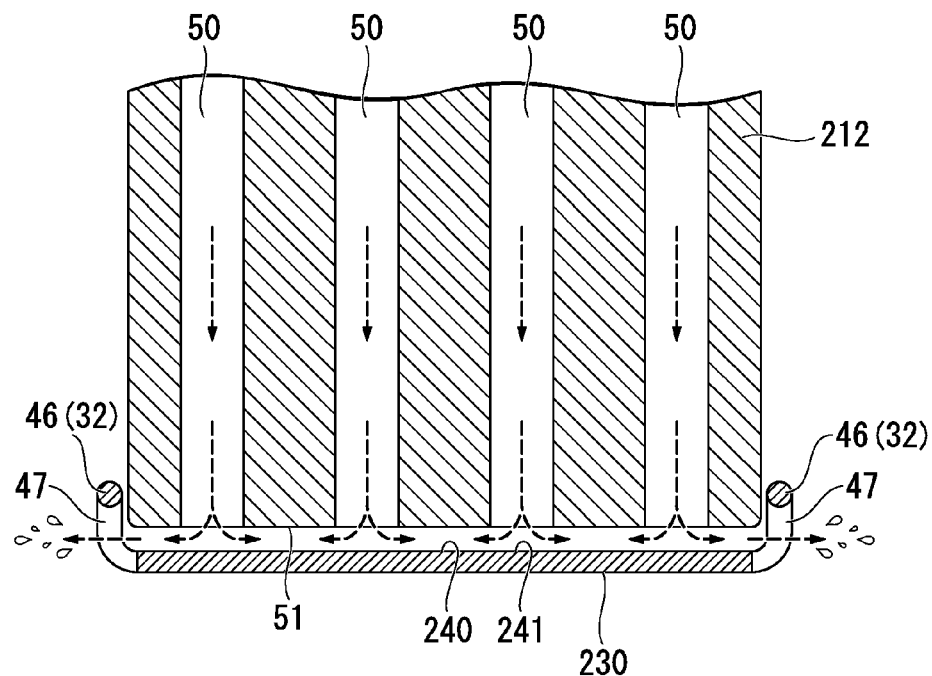
FIG. 8 is a cross-sectional view taken along line B-B of FIG. 7.

As illustrated in FIGS. 7 and 8, the groove portion 240 has a groove bottom surface 241 that extends substantially parallel to the bottom surface 34 of the electrical cell 10. A lower edge of the above-described insulating member 212 is arranged at a predetermined distance in the vertical direction front the groove bottom surface 241. The air, which is blown out through the air passageways 50 of the insulating members 212 from the lower edges thereof, is guided to the groove portions 240, respectively. The air guided to each groove portion 240 is ejected from the through-hole 47 to the outsides of the support plate 230 in the width direction.

Therefore, according to the cell module of the above-described second embodiment, the water that has dropped or flowed into the groove portion 240 is blown away to the outsides in the width direction by the air supplied through the air passageways 50 of the insulating member 212, and is ejected on the outsides of the support plate 230 in the width direction. Therefore, the electrical connection between the cases of the electrical cells 10 can be suppressed by preventing water horn stagnating between the cases of the electrical cells 10 adjacent to each other. As a result, trouble, such as corrosion, can be prevented from occurring.

In addition, the invention is not limited to the configuration of the above-described embodiment, and design changes can be made without departing from the concept of the invention. For example, an example in which the groove portion 40 in the width-side inclination surface 38 has been described in the above-described first embodiment.

However, the groove portion 40 of the width-side inclination surface 38 may be omitted. In this case, it is only necessary to make the dimension, in the arrangement direction, of the end of the width-side inclination surface 38 in the width direction, approximately equal to the dimension of the through-hole 48 in the arrangement direction.

Figure 9:
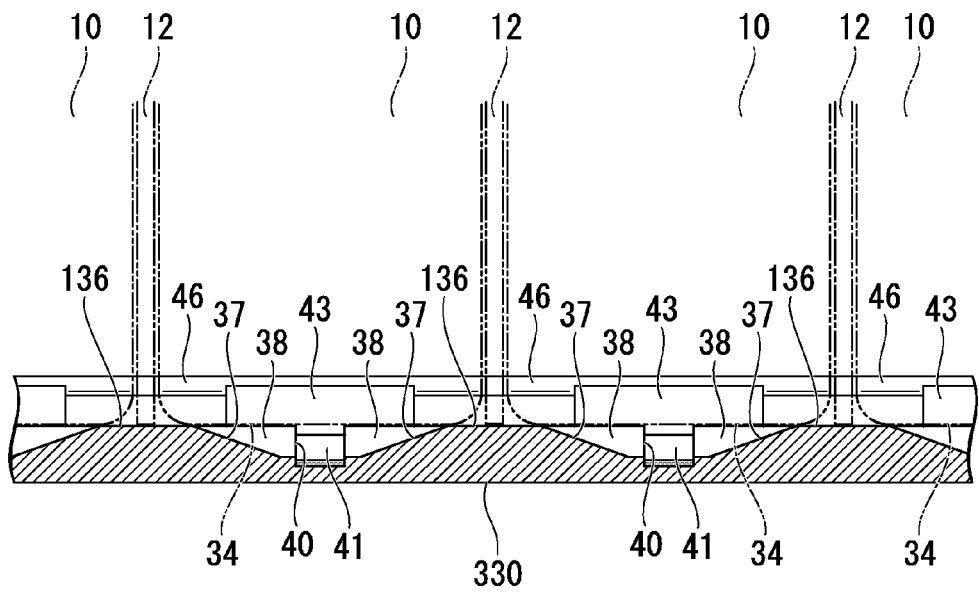
FIG. 9 is a cross-sectional view corresponding to FIG. 5 in a modified example of the first embodiment.

Additionally, a case where the first supporting portion 35 contacts with the central portion of the electrical cell 10 in the arrangement direction has been described in the first embodiment. However, the array-side inclination surface 37, the width-side inclination surface 38, and the groove portion 40 only have to be formed between the first supporting portions 35 adjacent to each other. For example, as in a modified example illustrated in FIG. 9, a supporting portion 136 may contact with both ends of the bottom surface 34 of the electrical cell 10 in the arrangement direction, and the groove portion 40 may be disposed below the center of the bottom surface 34 in the arrangement direction. Even in this case, since water flows down so as to be separate from a position between the electrical cells 10 adjacent to each other, that is, from a position where the insulating member 12 contacts with the support plate (bottom plate member) 330, water can be prevented from stagnating between the adjacent electrical cells 10. Here, the groove portion 40 may be omitted even in the modified example illustrated in FIG. 9.

Moreover, a case where the insulating member 12 is provided with the air passageways 50 has been described in the above-described second embodiment. However, if a shape is used that allows air to flow in the vertical direction while securing the electrical insulation between the adjacent electrical cells 10 by the insulating member 12, the shape of the air passageways 50 is limited to the shape illustrated in FIG. 6.

Figure 10:
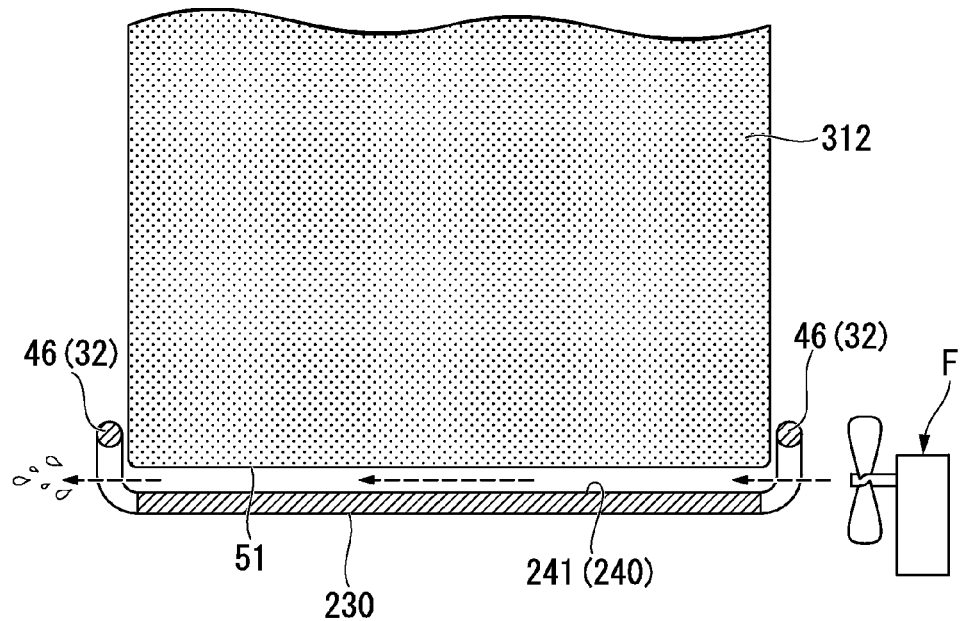
FIG. 10 is a cross-sectional view corresponding to FIG. 8 in a modified example of the second embodiment.

Additionally, an example in which air is supplied to the groove portion 240 via the air passageways 50 of the insulating member 12 has been described in the above-described second embodiment. However, as in a modified, example illustrated in FIG. 10, an air supply source F, such as a blower, may be arranged on one side of the outsides of the support plate 230 in the width direction, and the air supplied horn the air supply source F may pass through from one side of through-hole 47 toward the other side of the through-hole 47 in the width direction. By adopting such a configuration, the water in the groove portion 240 can be moved the other side by the air supplied from one side in the width direction and can be ejected horn the other through-hole 47 to the outsides of the support plate 230 in the width direction. In this case, a bottom portion of the groove portion 240 may not be formed with the first inclination surface that inclines toward a direction, in which water is ejected but may be formed with a horizontal surface.

Additionally, an example in which the groove portions 40 and 240 are formed in the width direction with a constant width has been, described in the above-described respective embodiments. However, the groove portions 40 and 240 are not limited to having the constant width. The groove portions 40 and 240 may be obliquely formed with respect to me width direction. Additionally, in the above-described respective embodiments, water has been described as an example of the fluid ejected to the outsides of the support plate 30 in the width direction. However, the fluid is not limited to water if fluids that may attach to the cell module are used.

Moreover, a case where the casing 13 is constituted of the upper cover 20, the support frames 14 and 15, the side plate 16, the upper cover 20, and the support plate 30 has been described in the first embodiment. However, in the invention, the casing 13 may have other configurations and shapes without being limited to the above-described configuration and shape except for the support plate that supports the battery pack 11 downward, or may be omitted.

INDUSTRIAL APPLICABILITY

In the cell module including a battery pack in which a plurality of cells are arranged, it is possible to suppress the electrical connection between the cases of the electrical cells adjacent to each other to prevent trouble, such as corrosion, from occurring.

REFERENCE SIGNS LIST

- 10: ELECTRICAL CELL
- 11: BATTERY PACK
- 12, 212: INSULATING MEMBER,
- 30, 230, 330: SUPPORT PLATE (BOTTOM PLATE MEMBER)
- 33: EJECTION PORTION (EJECTOR)
- 34: BOTTOM SURFACE
- 36: SUPPORTING PORTION
- 37: ARRAY-SIDE INCLINATION SURFACE (SECOND INCLINATION SURFACE)
- 38: WIDTH-SIDE INCLINATION SURFACE (FIRST INCLINATION SURFACE)
- 40, 240: GROOVE PORTION
- 41, 241: GROOVE-BOTTOM SURFACE FIRST INCLINATION SURFACE)

The invention claimed is:

1. A cell module comprising:
   a battery pack in which a plurality of electrical cells are arranged in the thickness direction of the electrical cells; and
   a bottom plate member that supports the battery pack, wherein
   the bottom plate member includes an ejector for ejecting a liquid on the bottom plate member to an outside of the bottom plate member in a direction intersecting in an arrangement direction of the electrical cells and in an extending direction of the bottom plate member,
   the ejector includes a first inclination surface that inclines toward the direction in which the liquid is ejected,
   the bottom plate member comprises a groove portion that is recessed in a direction separating from a bottom surface of the electrical cell and extends in the direction in which the liquid is ejected, and a supporting portion that contacts with the bottom surface of the electrical cell, and
   the groove portion is provided between the supporting portions adjacent to each other in the arrangement direction of the electrical cells.

2. The cell module according to claim 1,
   wherein the groove portion includes a first inclination surface, which inclines toward the direction in which the liquid is ejected, at the bottom portion of the groove portion.

3. The cell module according to claim 1,
   wherein the bottom plate member includes a second inclination surface that inclines so as to separate from the bottom surface of the electrical cell, from the supporting portion toward the groove portion.

4. The cell module according to claim 1,
   wherein the supporting portion linearly contacts with the bottom surface of the electrical cell in the direction intersecting the arrangement direction of the electrical cells and in the extending direction of the bottom plate member.

5. The cell module according to claim 1,
   wherein an insulating plate that performs electrical insulation between cases of the electrical cells adjacent to each other is provided between the cases of the electrical cells, and
   wherein the entire edge portion of the insulating plate on the bottom plate member side contacts with the bottom plate member.

6. The cell module according to claim 5,
   wherein the ejector is provided between the insulating plates.

* * * * *